United States Patent [19]

Symonds

[11] Patent Number: 4,815,545

[45] Date of Patent: Mar. 28, 1989

[54] SUBSOIL BLADE PLOUGHS

[76] Inventor: Darrell C. Symonds, 13 Linkwater St., Shelley, Australia, 6155

[21] Appl. No.: 849,707

[22] Filed: Apr. 9, 1986

[30] Foreign Application Priority Data

Apr. 9, 1985 [AU] Australia .............................. PH00063

[51] Int. Cl.[4] ...................... A01B 13/08; A01B 15/00
[52] U.S. Cl. .................................... 172/699; 172/657; 172/413; 172/483; 172/327
[58] Field of Search ............... 172/699, 657, 196, 413, 172/483, 327

[56] References Cited

U.S. PATENT DOCUMENTS

| 2,931,446 | 4/1960 | Gwinn | 172/657 X |
| 3,024,851 | 3/1962 | Harres | 172/699 |
| 3,120,281 | 2/1964 | Peveler | 172/699 |
| 3,584,692 | 6/1971 | Fasse | 172/699 |

FOREIGN PATENT DOCUMENTS

| 1386454 | 3/1975 | United Kingdom | 172/699 |
| 2053634 | 2/1981 | United Kingdom | 172/196 |
| 2118411 | 11/1983 | United Kingdom | 172/196 |

*Primary Examiner*—Richard J. Johnson
*Attorney, Agent, or Firm*—Cushman, Darby & Cushman

[57] ABSTRACT

Apparatus for fracturing below ground hard pans which includes entering a sub-soil tyne beneath the hard pan with upper surface angle in range of orientation which provides improved fracturing width.

1 Claim, 4 Drawing Sheets

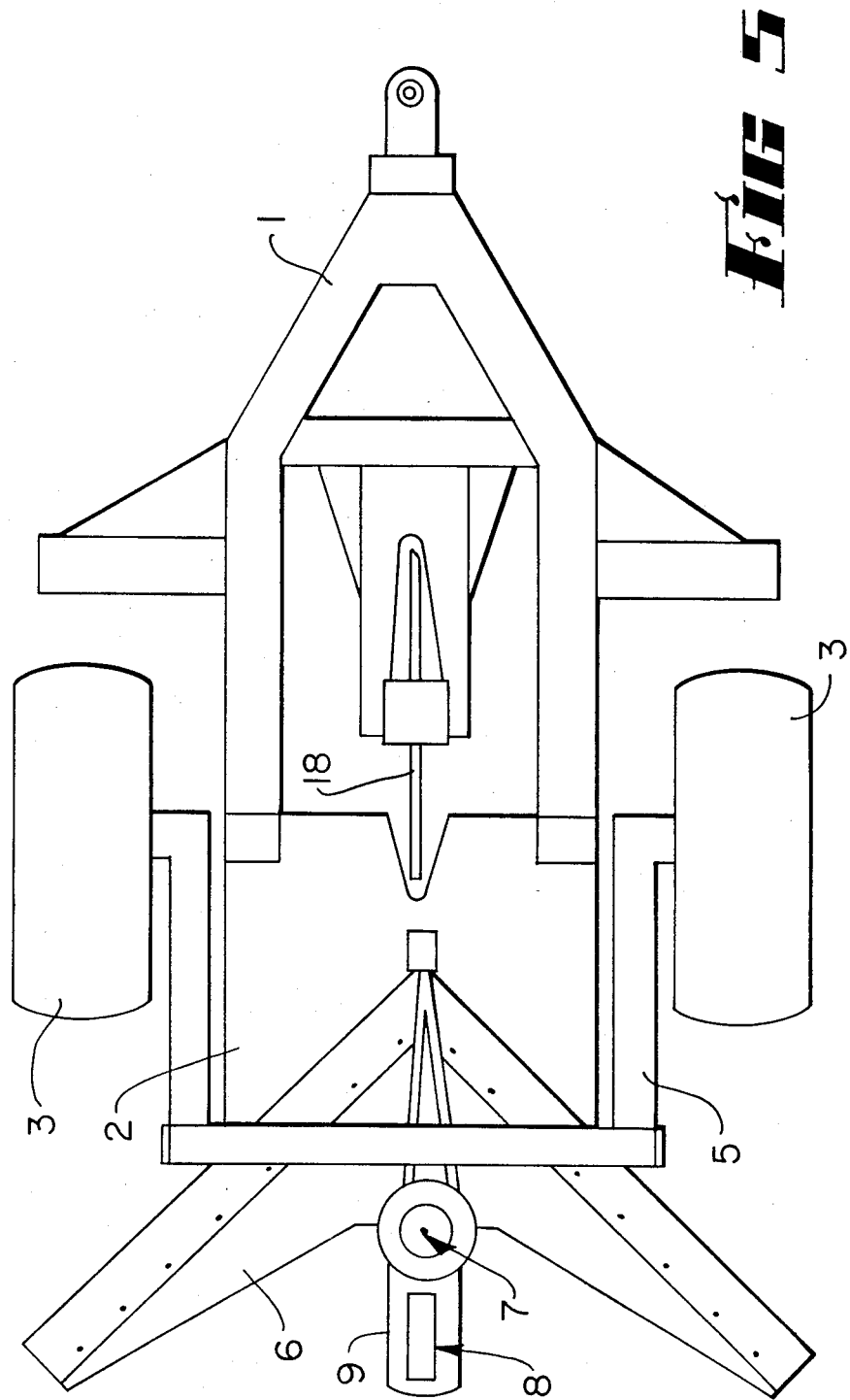

SUBSOIL BLADE PLOUGHS

This invention relates to a method of treating ground to improve growing conditions.

In some places in the world, and typically in pine forests in the United States of America, it has been found that a hard pan develops below the surface of the earth within which the trees are planted.

The causes of such a hard pan have been broadly discussed elsewhere but it is generally acknowledged that the existence of a hard pan of such a type immediately below a growing location of a tree, especially of a type such as a pine tree, can severely inhibit the subsequent growth of that tree.

The hard pan can comprise consolidated clays and can be of such density and structure that a subsequent tree will find significant difficulty, with severe retardation of growth, attempting to push its roots through such a pan.

It is not unknown to try to break this pan by pulling a tyne with a sharp end beneath the pan.

The problem has been hitherto that with tynes of previous manufacture and method of control, even though the tyne passes through and breaks an immediately localised area of the pan, the effect does not appear to be long lasting in that the materials forming the pan still remain in the vicinity, and while there is some improvement, the improvement does not last for any extended period of time.

I have discovered that if a tyne working below the pan has an upper face with a different angle of orientation when assessed from front to back as compared to the horizontal supporting ground plane, a quite different effect can be achieved which is of very significant advantage.

Accordingly, the invention can be said to reside in a method of treating ground to improve growing conditions, where such ground has extending below it but within growing range, a hard pan, which method comprises the steps of drawing through such ground a tyne, the tyne having a forwardmost sharp point, and extending rearwardly and being uppermost from the sharp point, an upper surface which is aligned to be within the range of orientation 23 degrees to 33 degrees relative to the horizontal and from a forward to rearward direction and so as to engage with such face the underneath side of the pan portion with a lifting and fracturing action.

In preference, such angle of orientation is 28 degrees.

In preference, the width of such upper surface is such as to provide adequate engagement of the pan material.

The invention can also be said to reside in apparatus for the treatment of ground which includes a tyne adapted to be used beneath a hard pan within the ground and to have an upper surface which is aligned to be within the range of orientation 23 degrees to 33 degrees as relative to the horizontal and from a forward to rearward direction where such surface is extending rearwardly and being uppermost from a forwardmost sharp point of the tyne.

In preference, such upper surface is orientated at approximately 28 degrees to the horizontal or any ground supporting plane if such plane is other than horizontal.

As the result of such an angle it has been discovered that a significantly greater proportion of the hard pan is found to be lifted with an accompanying fracturing action so that in experiments conducted, the hard pan over a width of approximately three feet is found subsequently to be fractured when a tyne according to a preferred embodiment and incorporating the above features is drawn in the manner described through the soil.

Such width of fracturing has been discovered to depend upon such an angle as has been illustrated and the effect appears to be that by the somewhat shallower angle that has been chosen and the very precise angle that is preferred, this appears to more effectively lift a much wider portion of the pan so that when fracturing starts to occur all of the material lifted is fractured, hence the much greater width of fracturing achieved.

The significantly greater area that can therefore be achieved for fracturing, from an otherwise extremely narrow tyne, provides very significant economic advantages as well as extremely useful improvement in subsequent growing conditions.

With such broader width of fracturing, it appears that reconstitution of the hard pan is much more difficult by the naturally occurring factors, and plants subsequently growing can pass through the pan area in a multitude of different locations.

For a better understanding of this invention it will now be described with the assistance of drawings in which:

FIG. 5 is a top plan view of the apparatus.

Figure 1:
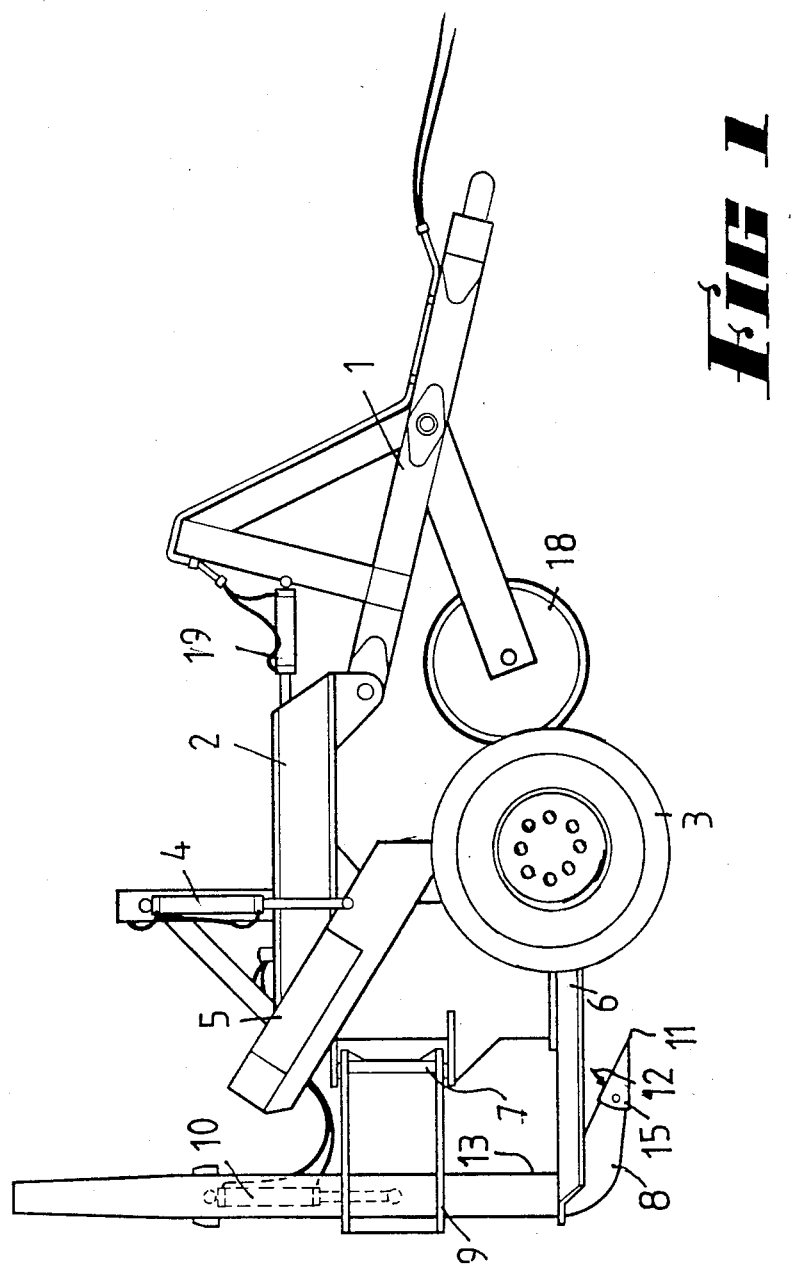
FIG. 1 is a side elevation of an apparatus according to a first embodiment.
Figure 2:
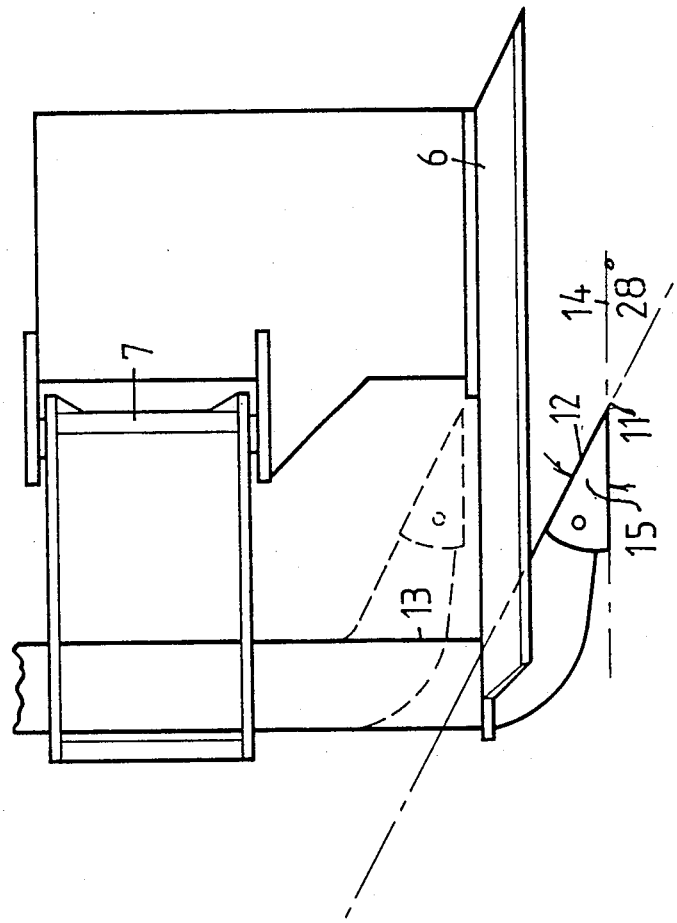
FIG. 2 is a side elevation of a portion of the apparatus showing, in particular, detail of the sub-soiling tyne.

Referring in detail to the drawings, the embodiment includes a draft frame 1 which is coupled to a main frame 2 which in turn is supported by ground engaging wheels 3 which are governed in relative height by control hydraulic ram 4 operating through pivotally supported frame 5.

The main frame 2 supports a blade plough 6.

Supported behind the blade plough 6, and such that it can rotate about a vertical pivot axis at 7, is a tyne 8.

The tyne 8 is supported by sub-frame 9 and is controlled in height relative to the ground by hydraulic ram 10 acting cooperatively relative to main frame 2 and ground engaging wheels 3.

The tyne 8 has a forwardmost sharp end at 11 and has secured over a front portion a separate nose which is of hardened metal to provide long wearing characteristics.

Of importance is the angular relationship of the upper surface 12 of this front nose the upper surface 12 being of a consistent width from the front sharp edge 11 to the front vertical edge 13.

This upper surface 12 is of planar alignment and is substantially linear when measured from the front edge 11 to the start of a curved portion entering into the front vertical edge 13.

The orientation of this upper surface 12 relative to the supporting ground plane which is conventionally horizontal and referred to as alignment 14, has an angle of 28 degrees as at 15.

The alignment of axis of the pivot support at 7 is such that this substantially coincides with the position of the front sharp end 11 with the effect that when the apparatus is pulled through the ground, the tyne will tend to follow in its pointing direction, a direction of travel.

Of importance, however, is the operation of this angle of orientation in the ground.

Figure 3:
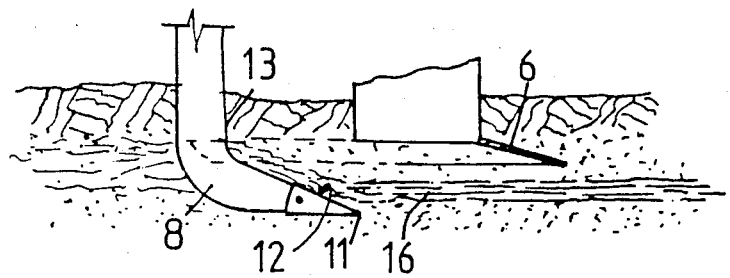
FIG. 3 is a side elevation of a portion of the apparatus when within the soil and in a digging situation with a hard pan.

By way of illustration, FIG. 3 illustrates the way in which the sub-soiling tyne 8 is to be held just below a hard pan 16 so that as the hard pan reaches the upper surface 12, this will be lifted somewhat gently but to such an extent before significant fracturing occurs so that when fracturing does occur, the width of fracturing is exceedingly extended and as has been indicated, such width can extend to approximately a total of three feet.

Figure 4:
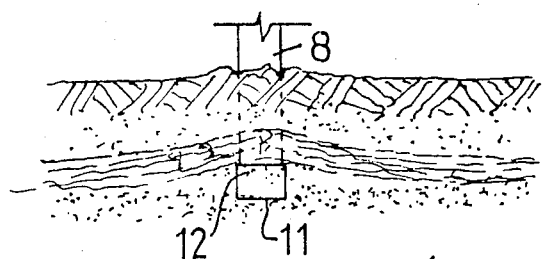
FIG. 4 is a view, once again in cross-section, through the ground from the front of the sub-soiling tyne illustrating the hard pan fracturing effect.

FIG. 4 shows this perhaps more graphically where the dramatic effect of lift in this way can be more easily seen.

Here again the tyne 8 operates to lift the hard pan 16 which is somewhat below the uppermost ground level at 17.

It has been found that while 28 degrees orientation is ideal, the advantage can be obtained with a wider range.

The method of operation is to pull such a tyne with the upper surface so that as compared to the alignment of the hard pan, the lifting angle from forward to rearward is this 28 degrees relative to a ground support alignment which would conventionally be the horizontal alignment of the ground supporting plane.

In conjunction with such a sub-soiling tyne there is significant advantage in providing accompanying cutting of roots using a blade plough, and in so far that a lot of debris will often be on the surface, a cutting coulter 18 is included as shown in FIG. 1, and the position of the coulter is governed by the relative position of frames 1 and 2 which is controlled by operation of hydraulic ram 19.

The claims defining the invention are as follows:

I claim:

1. Apparatus for the treatment of ground which comprises a frame, ground engaging wheels supporting the frame, means extending between the wheels and the frame and adapted to control the relative height of the frame with respect to the wheels, a horizontal blade plough blade supported by the frame, a sub-soiling tyne pivotally supported with respect to the frame the pivot axis being about a vertical axis, the tyne having a forwardmost sharp point and a rearwardly extending surface along an uppermost face adapted to act beneath the hard pan within soil to effect a lifting and fracturing of this, the orientation of such upper surface when measured from forward to rearward being within the range 23 degrees to 33 degrees as compared to a ground supporting plane, the pivot axis supporting the tyne being aligned so that the axis will intersect in the vicinity of the sharp end of the tyne, a draft frame connected to the main frame, such draft frame including a coulter, the draft frame being pivotally supported with respect to the main frame so as to be rotatable about a horizontal axis substantially transverse to a forward direction, and means securing the relative position of the draft frame with respect to the main frame about the said pivot axis.

* * * * *